(12) United States Patent
Sakashita et al.

(10) Patent No.: US 11,055,101 B2
(45) Date of Patent: Jul. 6, 2021

(54) PROCESSING APPARATUS AND CONTROLLING METHOD FOR PROCESSING APPARATUS

(71) Applicant: FUJITSU LIMITED, Kawasaki (JP)

(72) Inventors: Sota Sakashita, Kawasaki (JP); Norihito Gomyo, Tama (JP)

(73) Assignee: FUJITSU LIMITED, Kawasaki (JP)

( * ) Notice: Subject to any disclaimer, the term of this patent is extended or adjusted under 35 U.S.C. 154(b) by 115 days.

(21) Appl. No.: 16/423,898

(22) Filed: May 28, 2019

(65) Prior Publication Data
US 2019/0377581 A1    Dec. 12, 2019

(30) Foreign Application Priority Data

Jun. 7, 2018   (JP) .............................. JP2018-109332

(51) Int. Cl.
*G06F 9/38* (2018.01)
*G06F 9/30* (2018.01)
*G06F 9/54* (2006.01)

(52) U.S. Cl.
CPC ........ *G06F 9/3842* (2013.01); *G06F 9/30098* (2013.01); *G06F 9/30145* (2013.01); *G06F 9/30196* (2013.01); *G06F 9/544* (2013.01)

(58) Field of Classification Search
CPC .... G06F 9/3842; G06F 9/30196; G06F 9/544; G06F 9/30098; G06F 9/30145;

(Continued)

(56) References Cited

U.S. PATENT DOCUMENTS

| 5,553,256 A * | 9/1996 | Fetterman | G06F 9/30167 |
| | | | 711/204 |
| 6,339,821 B1 * | 1/2002 | Maeda | G06F 9/30185 |
| | | | 341/78 |

(Continued)

FOREIGN PATENT DOCUMENTS

JP          03-240131          10/1991

OTHER PUBLICATIONS

Jann Horn, "Reading privileged memory with a side-channel", [online], [searched on May 9, 2018], Project Zero, internet <https://googleprojectzero.blogspot.com/2018/01/reading-privileged-memory-with-side.html?m=1> (51 pages).

*Primary Examiner* — Farley Abad
(74) *Attorney, Agent, or Firm* — Fujitsu Patent Center

(57) ABSTRACT

A processing apparatus includes a processor. The processor stores a plurality of instruction codes, each of the plurality of instruction codes is a result of decoding of an instruction, selects an instruction code that is ready to be input from the stored instruction codes, when the selected instruction code is an operation instruction, uses for the processing, a register for processing corresponding to a write destination of the operation instruction, after detecting that operands to be used for the processing are ready, in the next cycle, issues a subsequent instruction, and when the selected instruction code is a memory access instruction, uses for the address calculation, the register, writes a processing result and load data that have been temporarily written in a buffer for register update from the buffer to the register at the time of instruction completion, after the completion of the memory access instruction, issues a subsequent instruction.

10 Claims, 9 Drawing Sheets

(58) Field of Classification Search
CPC ...... G06F 9/3016; G06F 9/3859; G06F 9/384; G06F 9/3836; G06F 21/554; G06F 21/52
See application file for complete search history.

(56) References Cited

U.S. PATENT DOCUMENTS

| | | | | |
|---|---|---|---|---|
| 6,553,484 B1* | 4/2003 | Sawamura | ............ | G06F 9/3836 712/207 |
| 2004/0006684 A1* | 1/2004 | Akizuki | ................ | G06F 9/3836 712/217 |
| 2008/0109614 A1* | 5/2008 | Begon | .................... | G06F 9/3863 711/154 |
| 2010/0095092 A1* | 4/2010 | Akizuki | ................ | G06F 9/3851 712/208 |
| 2016/0357552 A1* | 12/2016 | Sakashita | .............. | G06F 9/3857 |

* cited by examiner

PROCESSING APPARATUS AND CONTROLLING METHOD FOR PROCESSING APPARATUS

CROSS-REFERENCE TO RELATED APPLICATION

This application is based upon and claims the benefit of priority of the prior Japanese Patent Application No. 2018-109332, filed on Jun. 7, 2018, the entire contents of which are incorporated herein by reference.

FIELD

The embodiments discussed herein are related to a processing apparatus and a controlling method for a processing apparatus.

BACKGROUND

Concerns about security of processing apparatuses (or processors) such as central processing units (CPUs) have been rising since the discovery of security vulnerabilities. Among such security vulnerabilities, for example, an attack called Spectre has the following processes: (1) causing a processing apparatus to execute a program at a wrong branch destination to cause the hardware to speculatively perform memory access to an address of an access prohibited area protected by the operation of the program to read the data; and (2) converting the read data into an address and performing memory access. The processes (1) and (2) are speculative execution to a wrong path caused by branch misprediction and will be canceled in the end; however, the trace of the memory access in the process (2) will remain in the cache. If the trace of the memory access remains in the data cache, the content of the data that has been read by the process (1) can be guessed from the memory access execution time.

The attacks such as the above-mentioned Spectre can be blocked by restricting the hardware operation of a speculative execution. If the speculative execution is restricted as measures against attacks such as Spectre, however, the performance of the processing apparatus may significantly deteriorate.

Related arts are disclosed in the following documents. Japanese Laid-open Patent Publication No. 03-240131, and Jann Horn, "Reading privileged memory with a side-channel", [online], [searched on May 9, 2018], internet <https://googleprojectzero.blogspot.com/2018/01/reading-privileged-memory-with-side.html?m=1>

SUMMARY

According to an aspect of the embodiments, a processing apparatus includes a processor. The processor stores a plurality of instruction codes, each of the plurality of instruction codes is a result of decoding of an instruction, selects an instruction code that is ready to be input from the stored instruction codes, when the selected instruction code is an operation instruction, uses for the processing, a register for processing corresponding to a write destination of the operation instruction, after detecting that operands to be used for the processing are ready, in the next cycle, issues a subsequent instruction, and when the selected instruction code is a memory access instruction, uses for the address calculation, the register, writes a processing result and load data that have been temporarily written in a buffer for register update from the buffer to the register at the time of instruction completion, after the completion of the memory access instruction, issues a subsequent instruction.

The object and advantages of the invention will be realized and attained by means of the elements and combinations particularly pointed out in the claims. It is to be understood that both the foregoing general description and the following detailed description are exemplary and explanatory and are not restrictive of the invention.

DESCRIPTION OF EMBODIMENTS

In known techniques, if speculative execution is stopped as a measure against attacks targeting security vulnerabilities, the performance of the processing apparatus significantly deteriorates.

Hereinafter, embodiments of a processing apparatus and a method of controlling the processing apparatus will be described with reference to the drawings.

Figure 1:
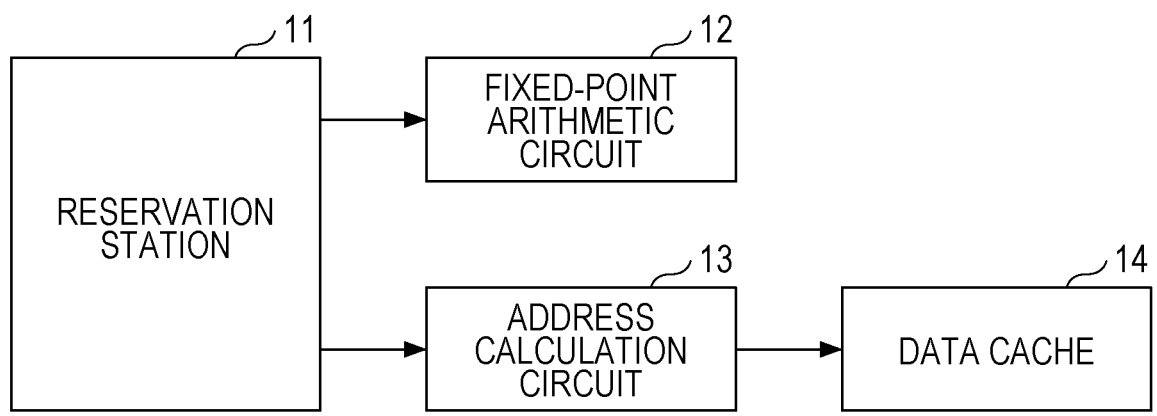
FIG. 1 is a block diagram illustrating an example of a configuration of components around a reservation station in a processing apparatus.

FIG. 1 is a block diagram illustrating an example of a configuration of components around a reservation station (RS) in a processing apparatus. The reservation station 11 may include a queue that stores instruction codes. When the instruction code stored in the queue is ready to be issued, the reservation station 11 may issue the instruction code to at least any of a fixed-point arithmetic circuit 12, an address calculation circuit 13, and a data cache 14.

An attack called Spectre includes the following processes:
(1) causing a processing apparatus to execute a program at a wrong branch destination to cause the hardware to speculatively perform memory access to an address of an access prohibited area protected by the operation of the program to read the data; and
(2) converting the read data into an address and perform memory access. The access prohibited area is set, for example, by an operating system (OS). The speculative memory access is speculatively executed by the hardware and is an instruction not executed in the original operation. Accordingly, the processes (1) and (2) will be canceled in the end, however, the trace of the memory access in the process (2) will remain in the cache. If the trace of the memory access remains in the data cache, the content of the data that has been read by the process (1) can be guessed from the memory access execution time.

However, if the speculative execution is restricted as a measure against the attacks such as Spectre, the performance of the processing apparatus may significantly deteriorate. Accordingly, in this embodiment, the speculative execution of the memory access in the process (2) is restricted in the reservation station 11. Specifically, whether the load instruction in the process (1) has been completed, that is, whether or not the instruction is a speculative memory access and has been canceled is determined. If the speculative memory access has not been canceled, the process (1) and the process (2) are to be executed for the load instruction. On the other hand, in the case in which the speculative memory access has been canceled, the speculative execution is canceled before the execution of the memory access in the process (2), and thus the trace of the memory access does not remain in the data cache 14. Accordingly, the content of the data that has been read by the process (1) is not guessed from the memory access execution time by using the trace of the memory access.

The reservation station 11 is able to distinguish whether an instruction code is a memory access instruction or an operation instruction, select only the memory access instruction as a target to be restricted, and speculatively execute instructions such as operation instructions other than memory access instructions. Furthermore, the reservation station 11 determines whether a memory access instruction is speculative or not based on the state of a preceding instruction. When a preceding instruction has been completed (hereinafter, may be referred to as "instruction completion"), there is no time for waiting for the determination of whether or not the memory access instruction is speculative. Accordingly, while measures against security vulnerabilities are taken, the performance deterioration of the processing apparatus is reduced. In other words, when some speculative executions are restricted as measures against attacks targeting security vulnerabilities, the performance deterioration of the processing apparatus may be reduced. The instruction completion will be described below.

Figure 2:
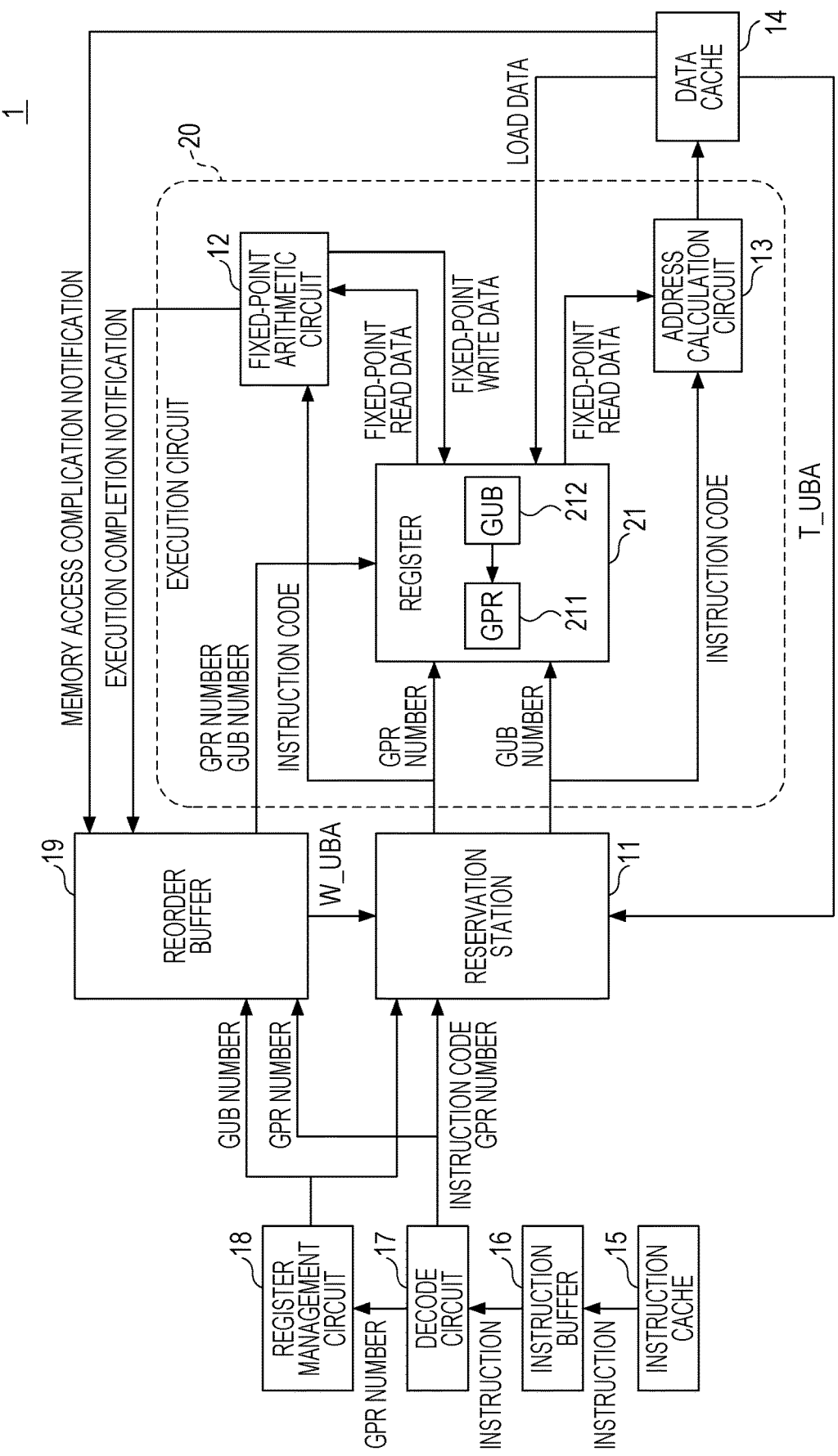
FIG. 2 is a block diagram illustrating an example configuration of a processing apparatus according to an embodiment.

FIG. 2 is a block diagram illustrating an example of a processing apparatus according to the embodiment. FIG. 2 illustrates a processor core of a processor 1 that is an example processing apparatus. The processor 1 includes the reservation station 11, the data cache 14, an instruction cache 15, an instruction buffer 16, a decode circuit 17, a register management circuit 18, a reorder buffer 19, and an execution circuit 20. The execution circuit 20 includes the fixed-point arithmetic circuit 12, the address calculation circuit 13, and a register 21.

The instruction cache 15 stores an instruction and the instruction buffer 16 stores the instruction stored in the instruction cache 15. The decode circuit 17 interprets the instruction stored in the instruction buffer 16 (that is, performs instruction interpretation), and inputs the instruction code to the reservation station 11. Accordingly, the decode circuit 17 outputs an instruction code that is a result of the decoding of an instruction. The reservation station 11 stores an interpreted instruction code that is a result of an instruction interpretation.

The reservation station 11 determines whether to input an instruction code to the fixed-point arithmetic circuit 12 or the address calculation circuit 13 in the execution circuit 20. The reservation station 11 is able to select an instruction code from instruction codes that are ready to be input to the execution circuit 20 and input the selected instruction to the fixed-point arithmetic circuit 12 or the address calculation circuit 13 in the execution circuit 20 in out-of-order execution not according to the original instruction order of the program (in-order execution). The reservation station 11 sends a general-purpose register (GPR) number and a GPR update buffer (GUB) number, which will be described below, to the register 21 in the execution circuit 20. The GUB number is an example first number, and the GPR number is an example second number.

The register 21 in the execution circuit 20 includes a GPR 211 and a GUB 212. The GPR 211 is a general-purpose register for fixed-point arithmetic, and the GUB 212 is a buffer for general-purpose register update and is provided to increase processing speed. When an instruction code that is selected and input by the reservation station 11 is an operation instruction (may be referred to as "calculation instruction", the execution circuit 20 uses the GPR 211 for the processing and when the instruction code is a memory access instruction, uses the GPR 211 for the address calculation. The GPR 211 may include the GUB 212. The calculation result and load data are temporarily written in the GUB 212 and, when the instruction is completed, written from the GUB 212 to the GPR 211. The GUB 212 is used for the processing of an operation instruction; however, the GUB 212 is not used for the address calculation of a memory access instruction.

Specifically, in a case in which an operation instruction is processed, data in the GUB 212 or GPR 211 is read and used for the processing in the fixed-point arithmetic circuit 12. Whereas, in a case in which a memory access instruction (load instruction or store instruction) is processed, data in the GPR 211 is read and used for the address calculation in the address calculation circuit 13, the calculated memory address is input to the data cache 14, and the data is read. The data read from the data cache 14 is temporarily written in the GUB 212, and when the instruction is completed, written from the GUB 212 to the GPR 211. Note that if a cache miss occurs after pipeline processing, as long as the data in the GPR 211 can be read, speculative execution of the instruction can be performed.

The fixed-point write data is sent from the fixed-point arithmetic circuit 12 to the register 21. The fixed-point read data is sent from the register 21 to the fixed-point arithmetic circuit 12 and also to the address calculation circuit 13. The load data from the data cache 14 is sent to the register 21.

The decode circuit 17 allocates the GUB 212 to the GPR 211 that is a write destination of an operation instruction. In this example, the register management circuit 18 includes a GPR pending register table (GPRT) that records an update buffer address (UBA) of the GUB 212 that is allocated by the decode circuit 17. The UBA of the GUB 212 is an example GUB number. When an instruction code is issued from the decode circuit 17 to the reservation station 11, the instruction code registers a UBA in an entry of the GPRT that corresponds to the GPR 211 that is the write destination specified by the GPR number in the register management circuit 18, and reads the UBA (that is, the GUB number) registered in the entry of the GPRT that corresponds to the GPR 211 of the GPR number used for the processing. Specifically, when the GUB number is registered in the GPRT in the register management circuit 18, the instruction code refers to the GUB 212 corresponding to the GUB number, and when the GUB number is not registered, the instruction code refers to the GPR 211 specified by the GPR number and the instruction is executed. In the completion of the instruction, the data of the GUB 212 is written in the GPR 211, and thus the GUB number in the GPRT in the register management circuit 18 becomes invalid. Accordingly, the reservation station 11 discards the stored GUB number and the execution circuit 20 refers to the GPR 211 corresponding to the GPR number and executes the instruction code.

A pipeline stage in executing a load instruction includes cycles described below.

In a decode (D: Decode) cycle, an instruction is decoded and sent to the reservation station 11.

In a priority (P: Priority) cycle, an instruction to be input from the reservation station 11 to the address calculation circuit 13 is determined. When an instruction is queued in the reservation station 11, the stage is not shifted to the P cycle.

In a buffer (B: Buffer) cycle, data for the processing is determined. In the B cycle, reading of the GPR 211 is also performed.

In an address (A: Address) cycle, address calculation is executed and a generated address is sent to the data cache 14.

In a tag read (T: Tag read) cycle, a tag in the data cache 14 is read.

In a tag match (M: tag Match) cycle, tag matching of the data cache 14 is performed, and a cache hit determination or a cache miss determination is performed. When a determination result is a cache miss, the stage returns to the A cycle. When a determination result is a cache miss, the stage may return to the D cycle.

In a result (R: Result) cycle, the cache-hit data is written in the GUB 212.

In a commit (C: Commit) cycle, instruction completion is determined. Since the instruction completion is performed in accordance with the original instruction order, if a preceding instruction has not been completed (committed), the stage is not shifted to the C cycle.

In a write (W: Write) cycle, data in the GUB 212 is written in the GPR 211 and the UBA is discarded.

In the B cycle, a reference result of the GUB 212 or a reference result of the GPR 211 is selected. When an immediate value is used or data selection for bypass processing from the circuit 12, the circuit 13, or a load instruction is performed, the processing is performed in the B cycle. The data in the GUB 212 is written to the GPR 211 in the W cycle for performing instruction completion processing. The free entry in the GUB 212 is to be allocated to a succeeding instruction, and accordingly, the entry in the GUB 212 is not referred to from the time the instruction has been completed. Accordingly, the reservation station 11 holds in each entry a GPR_VALID signal that indicates whether or not the GPR 211 is to be referred to. When the GPR_VALID signal is "1", in the B cycle, the data read from the GPR 211 is selected. On the other hand, when the GPR_VALID signal is "0", the bypass data or the data in the the GUB 212 is selected. The GPR_VALID signal is held together with the UBA in the GPRT, and "0" is set when the UBA is allocated and "1" is set when the instruction is completed. The registration to the reservation station 11 is performed together with the UBA in referring to the GPRT. The setting of the GPR_VALID in the reservation station 11 is performed when the instruction is completed similarly to the GPRT.

The processor 1 may execute processing in the out-of-order execution and the instruction execution may be different from the original instruction order of the program; however, the processor 1 executes the instruction completion in the in-order execution in accordance with the original instruction order. Accordingly, the processing from the instruction execution to the instruction completion may be immediately performed or may be performed after waiting for the execution of a preceding instruction.

The reorder buffer 19 may input an instruction code in the out-of-order execution; however, the reorder buffer 19 completes the instruction code in the in-order execution in accordance with the original instruction order. The reorder buffer 19 receives the GPR number from the decode circuit 17 and receives the GUB number from the register management circuit 18. The reorder buffer 19 sends the GPR number and the GUB number to the execution circuit 20 at the time of instruction completion. Furthermore, the reorder buffer 19 sends a W_UBA that is a write destination UBA of a completed instruction to the reservation station 11. The execution circuit 20 writes the data of the GUB 212 that corresponds to the GUB number in the GPR 211 that corresponds to the GPR number. By the processing in the instruction completion, the results of the calculation and load are reflected in the GPR 211. Accordingly, the results of the processing and load are reflected in the GPR 211 such that the results can be observed from software.

Figure 3:
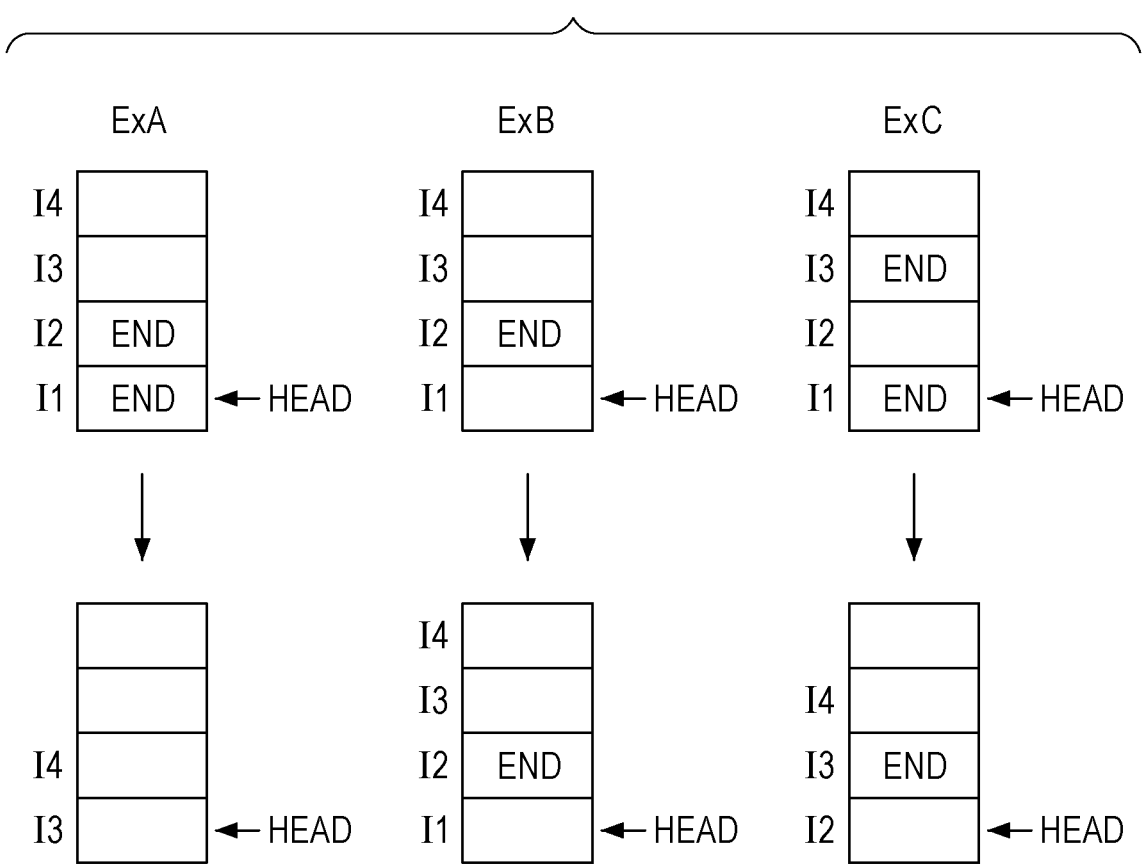
FIG. 3 illustrates an example reorder buffer and instruction completion.

FIG. 3 illustrates an example reorder buffer and instruction completion. In the example in FIG. 3, for the sake of convenience, the reorder buffer 19 has four entries and reference is made to FIG. 2.

A determination whether or not to complete an instruction is made by using a completion notification such as a processing completion notification from the fixed-point arithmetic circuit 12 or a memory access completion notification from the data cache 14. The reorder buffer 19 completes entries which have received completion notifications in order from the head. In FIG. 3, an entry that has received a completion notification is indicated by "END". The reorder buffer 19 may be, for example, a first-in-first-out (FIFO) queue that perform completion processing from the head. In an example E×A in an upper part in FIG. 3, the head is an instruction I1 and an instruction I1 has received a completion notification, and thus the instruction I1 can be completed. When multiple instructions can be simultaneously completed, since the instruction I1 has been completed, an instruction I2 can be simultaneously completed. In an example E×B in an upper part in FIG. 3, although the instruction I2 has received the completion notification, the instruction I1 has not yet been completed, and accordingly, the instruction I2 has not been completed. In an example E×C in an upper part in FIG. 3, the instruction I1 has completed and is at the head, and accordingly, the instruction I1 can be completed. However, an instruction I2 has not received the completion notification, and thus the instruction I3 has not been completed even though the instruction I3 has received the completion. For reference, the next states of the examples E×A, E×B, and E×C are illustrated in a lower part in FIG. 3. The completed instructions are dequeued and the other instructions are moved, and instructions at the head positions are changed. In the example E×B, in the next state, the instruction has not been completed, and thus the state of the example E×B and the next state of the example E×B are the same.

In this embodiment, the reservation station 11 restricts issuance of a memory access instruction by using the GPR_VALID signal that is held by the reservation station 11 for each entry. The reservation station 11 stores a memory access instruction and also an operation instruction. In order to distinguish the memory access instruction and the operation instruction, the reservation station 11 holds a MEM_INST flag for each entry. The MEM_INST flag for each entry is a flag used such that even if a GUB_READY signal for a corresponding entry is set to "1", for example, a READY signal for the corresponding entry is avoided from becoming valid, that is, in this example, avoided from being set to "1". The GUB_READY signal for each entry indicates whether the data can be read from the corresponding entry in the GUB 212. When the MEM_INST flag for an entry is "1", it indicates that the instruction of the entry is a memory access instruction. The decode circuit 17 determines, when interpreting the instruction, whether to set the MEM_INST flag, that is, whether to set the flag to "1" or reset to "0". Specifically, to the reservation station 11, the decode circuit 17 sets the MEM_INST flag that is example information for distinguishing whether the instruction is a memory access instruction or an operation instruction. The number of the GPR_VALID signals and the GUB_READY signals held by each entry in the reservation station 11 is the same number of source operands used for the processing.

For example, in this example, two source operands are used; however, the number of operands is not limited to two, and one, or for example, three operands may be used. Each of the two source operands SRC1 and SRC2 holds a UBA and a GPR_VALID signal. The first source operand SRC1 holds a SRC1_UBA and a SRC1_GPR_VALID signal, and the second source operand SRC2 holds a SRC2_UBA and a SRC2_GPR_VALID signal. To each of the UBA and GPR_VALID signal, a value obtained by referring to the GPRT of the register management circuit 18 at the time of instruction decoding is registered. The setting of the GPRT and the GPR_VALID signal held by the reservation station 11 is performed at the time of the instruction completion. The source operand SRC1 holds a SRC1_GUB_READY signal that indicates whether or not the data in the GUB 212 can be read. The source operand SRC2 holds a SRC2_GUB_READY signal that indicates whether or not the data in the GUB 212 can be read. For example, when the SRC1_GUB_READY signal is set to "1", it indicates that the corresponding source operand SRC1 can be read from the GUB 212, that is, a preceding instruction has executed the processing. With respect to an operation instruction, when the GUB_READY signals or the GPR_VALID signals for all source operands are set to "1", all preceding dependent instructions have been executed, and the source operands to be used for the processing are available. In this case, the reservation station 11 sets the READY signal that indicates that an instruction code can be issued to "1", and in the next cycle, the reservation station 11 is able to issue the instruction code to the fixed-point arithmetic circuit 12 or the address calculation circuit 13.

Figure 4:
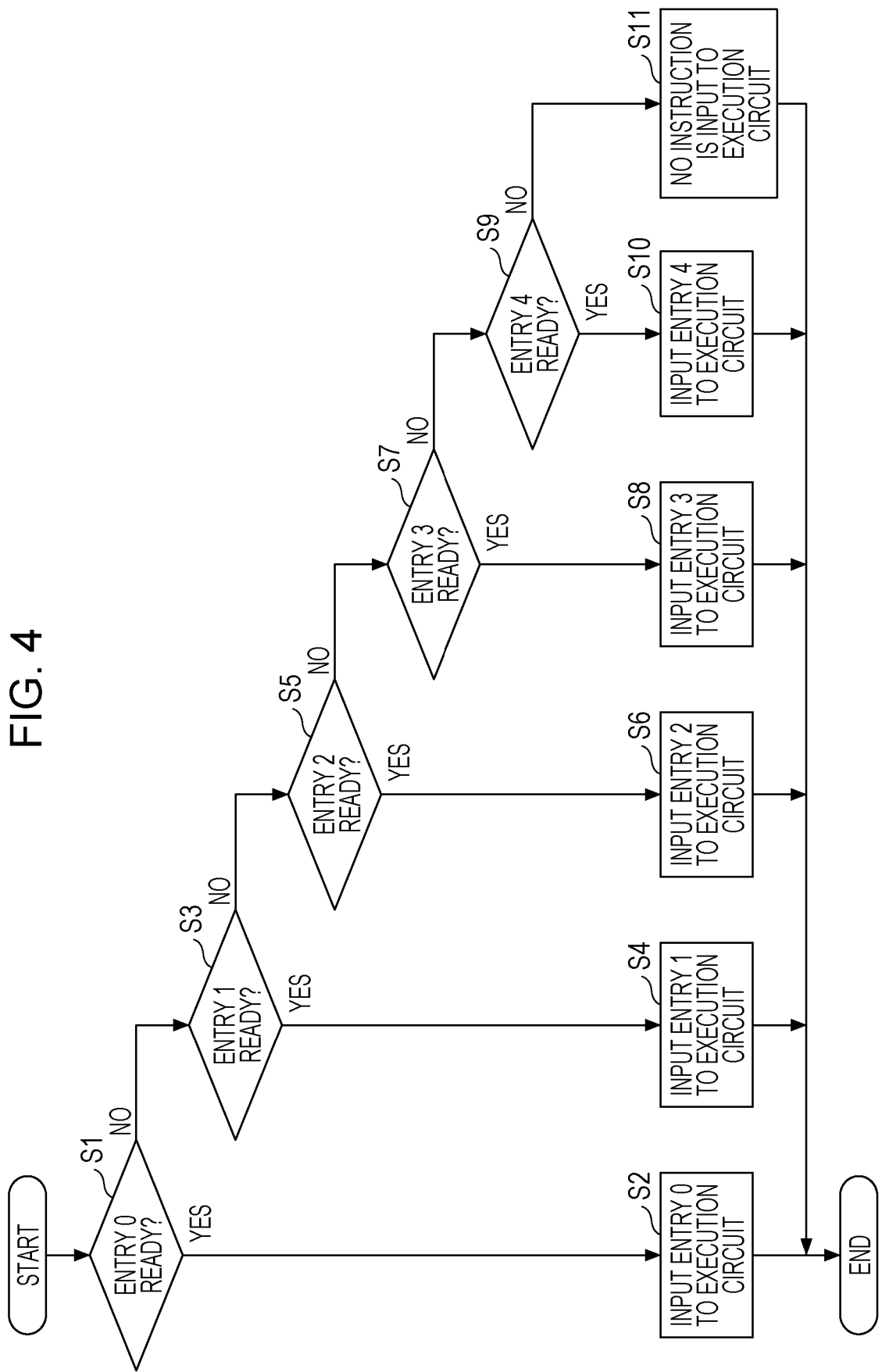
FIG. 4 is a flowchart illustrating processing of selecting an entry.

FIG. 4 is a flowchart illustrating processing of selecting an entry in a reservation station. FIG. 4 illustrates that the number of entries is five. Although a method of selecting an entry is not limited to a specific method, in this example, the description will be made by employing a bubble-up queue configuration and with reference to FIG. 2.

In this example, an entry 0 in the reservation station 11 is the oldest entry and an entry 4 is the newest entry. Accordingly, the entry 0 has the highest priority in selecting an entry. When the entry 0 is selected, an entry 1 and all entries after the entry 1 move by one entry. Since an entry can be speculatively selected, an entry after the entry 1 may be selected. For example, when the entry 1 is selected, the entry 2 and the entries after the entry 2 move. In accordance with the rule, the entry selection is performs as illustrated in FIG. 4.

In FIG. 4, first, whether the READY signal for the entry 0 is "1" or not is determined (step S1). If the determination result in step S1 is YES, the entry 0 is input to the fixed-point arithmetic circuit 12 or the address calculation circuit 13 (step S2). If the determination result in step S1 is NO, whether the READY signal for the entry 1 is "1" or not is determined (step S3). If the determination result in step S3 is YES, the entry 1 is input to the fixed-point arithmetic circuit 12 or the address calculation circuit 13 (step S4). If the determination result in step S3 is NO, whether the READY signal for the entry 2 is "1" or not is determined (step S5). If the determination result in step S5 is YES, the entry 2 is input to the fixed-point arithmetic circuit 12 or the address calculation circuit 13 (step S6). If the determination result in step S5 is NO, whether the READY signal for the entry 3 is "1" or not is determined (step S7). If the determination result in step S7 is YES, the entry 3 is input to the fixed-point arithmetic circuit 12 or the address calculation circuit 13 (step S8). If the determination result in step S7 is NO, whether the READY signal for the entry 4 is "1" or not is determined (step S9).

If the determination result in step S9 is YES, the entry 4 is input to the fixed-point arithmetic circuit 12 or the address calculation circuit 13 (step S10). If the determination result in step S9 is NO, all READY signals for the entries are not set to "1", and no instruction is input to the fixed-point arithmetic circuit 12 or the address calculation circuit 13 (step S11). After one of the steps S2, S4, S6, S8, S10, and S11, the processing ends.

Note that since the bubble-up circuit for implementing bubble-up is well known, illustration and description of the bubble-up circuit are omitted.

In this embodiment, when the READY signal for a memory access instruction is set to "1", not only relying on only the GUB_READY signal, but also the GPR_VALID signal is set to "1", and then, the READY signal is set to "1". By the processing, it is ensured that the memory access instruction executes the processing by referring to the GPR 211 without referring to the GUB 212. Writing from the GUB 212 to the GPR 211 is performed after completion of the instruction, that is, after it is confirmed that the instruction for updating the GPR 211 is not speculative and is not canceled. When a speculative execution is canceled without completion of a preceding instruction, the GPR_VALID signal is set to "0", and a memory access instruction in the process (2) by an attack such as Spectre is canceled without being issued from the reservation station 11. Accordingly, the memory access instruction does not speculatively access the data cache 14 and no trace remains in the data cache 14. On the other hand, an operation instruction uses the GUB_READY signal to set the READY signal for the operation instruction to "1", and thus speculatively executes the instruction without being directly affected by the control.

Figure 5:
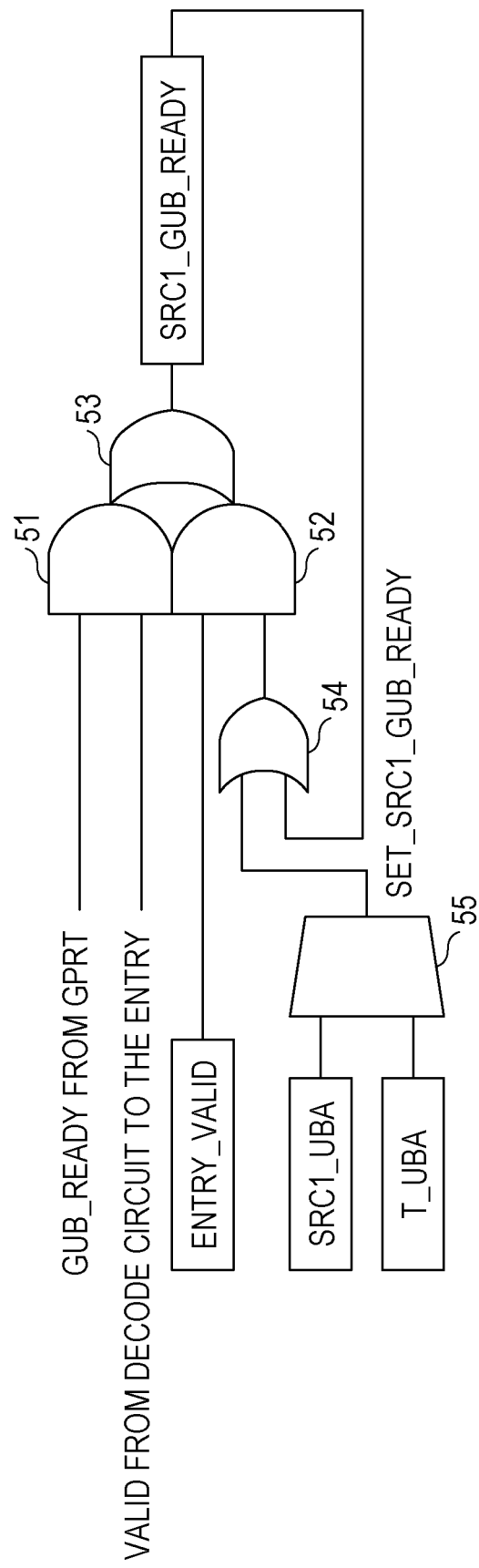
FIG. 5 illustrates an example of a circuit that generates a GUB_READY signal.

FIG. 5 illustrates an example of a circuit that generates a GUB_READY signal for a reservation station. FIG. 5, with reference to FIG. 2, illustrates circuits for one entry for the source operand SRC1. Circuits for the source operand SRC2 have a similar configuration. Accordingly, for each source operand, similar circuits are configured for each entry in the reservation station 11. The circuits in FIG. 5 include AND circuits 51 and 52, OR circuits 53 and 54, and a match detection circuit 55. To the AND circuit 51, a GUB_READY signal from the GPRT in the register management circuit 18 and a VALID signal from the decode circuit 17 to the entry are input. To the AND circuit 52, an ENTRY_VALID signal and an output from the OR circuit 54 are input. To the OR circuit 53, outputs from the AND circuits 51 and 52 are input. To the match detection circuit 55, an SRC1_UBA and a T_UBA are input. The SRC1_UBA contains a write destination UBA of a preceding dependent instruction. The T_UBA from the data cache 14 is a write destination UBA of a load instruction, and is a signal of the T cycle. To the OR circuit 54, a SET_SRC1_GUB_READY signal, which is an output from the match detection circuit 55, and a SRC1_GUB_READY signal, which is an output from the OR circuit 53, are input.

When an instruction code is registered to the reservation station 11 (in the D cycle), the VALID signal from the decode circuit 17 to the entry is set to "1". The instruction code is registered in a free entry, and thus the ENTRY_VALID signal that indicates whether the entry in the reservation station 11 is occupied and valid is set to "0". Accordingly, the output from the AND circuit 52 is "0" and whether "0" is set or "1" is set to the SRC1_GUB_READY signal is determined by a GUB_READY signal from the GPRT. When the ENTRY_VALID signal is "1", the entry is not free, and it is ensured that the VALID signal from the decode circuit 17 to the entry is not "1", and the output by the AND circuit 51 becomes "0". When the ENTRY_VALID signal is "1", the value to be set to the SRC1_GPR_VALID signal is determined by an output from the OR circuit 54. One of the inputs to the OR circuit 54 is input by looping back the value of the SRC1_GPR_VALID signal that is output from the OR circuit 53. When the SRC1_GPR_VALID signal is reset to "0" while the SRC1_GUB_READY signal holds the state "1", the ENTRY_VALID signal becomes "0", that is, the instruction code is input from the reservation station 11 to the fixed-point arithmetic circuit 12 or the address calculation circuit 13. To set the SRC1_GUB_READY signal to "1" when the ENTRY_VALID signal is "1", the SET_SRC1_GUB_READY signal that is an output from the match detection circuit 55 is to be "1". The SRC1_UBA contains a write destination UBA of a preceding dependent instruction. The T_UBA is a write destination UBA of a load instruction, and is a signal of the T cycle. The signal of the T cycle is used in order to minimize the timing from writing to the GUB 212 to reading of a subsequent instruction from the GUB 212. When the SRC1_UBA and the T_UBA match, it is understood that the load result has been written in the GUB 212, and the SRC1_GUB_READY signal is set to "1". Although illustration is omitted in FIG. 5, an operation instruction also updates the GUB 212 and accordingly, a plurality of match detection circuit 55 may be provided. In this example, a circuit that obtains an OR of all match detection results is added to a subsequent stage of the match detection circuit 55.

Figure 6:
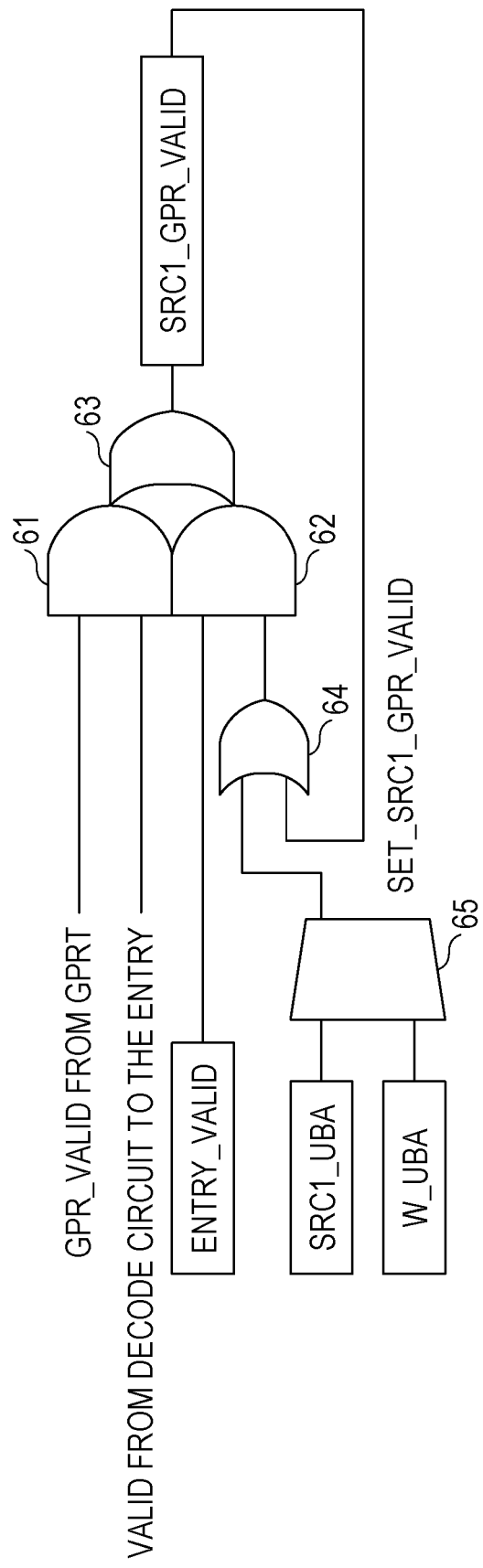
FIG. 6 illustrates an example of a circuit that generates a GPR_VALID signal.

FIG. 6 illustrates an example of a circuit that generates a GPR_VALID signal for a reservation station. FIG. 6 illustrates, with reference to FIG. 2, circuits for one entry for the source operand SRC1. Circuits for the source operand SRC2 have a similar configuration. Accordingly, for each source operand, similar circuits are configured for each entry in the reservation station 11. The circuits in FIG. 6 include AND circuits 61 and 62, OR circuits 63 and 64, and a match detection circuit 65. To the AND circuit 61, a GPR_VALID signal from the GPRT in the register management circuit 18 and a VALID signal from the decode circuit 17 to the entry are input. To the AND circuit 62, an ENTRY_VALID signal and an output from the OR circuit 64 are input. To the OR circuit 63, outputs from the AND circuits 61 and 62 are input. To the match detection circuit 65, a SRC1_UBA and a W_UBA, which is a write destination UBA of a completed instruction and output from the reorder buffer 19, are input. To the OR circuit 64, a SET_SRC1_GPR_VALID signal, which is an output from the match detection circuit 65, and a SRC1_GPR_VALID signal, which is an output from the OR circuit 63, are input.

When an instruction code is registered to the reservation station 11 (in the D cycle), the VALID signal from the decode circuit 17 to the entry is set to "1". The instruction code is registered in a free entry, and thus the ENTRY_VALID signal that indicates whether the entry in the reservation station 11 is occupied and valid is set to "0". Accordingly, the output from the AND circuit 62 is "0" and whether "0" is set or "1" is set to the SRC1_GPR_VALID signal is determined by a GPR_VALID signal from the GPRT. When the ENTRY_VALID signal is "1", the entry is not free, and it is ensured that the VALID signal from the decode circuit 17 to the entry is not "1" and the output from the AND circuit 61 becomes "0". When the ENTRY_VALID signal is "1", the value to be set to the SRC1_GPR_VALID signal is determined by an output from the OR circuit 64. One of the inputs to the OR circuit 64 is input by looping back the value of the SRC1_GPR_VALID signal that is output by the OR circuit 63. When the SRC1_GPR_VALID signal is reset to "0" while the SRC1_GPR_VALID signal holds the state "1", the ENTRY_VALID signal becomes "0", that is, the instruction code is input from the reservation station 11 to the fixed-point arithmetic circuit 12 or the address calculation circuit 13. To set the SRC1_GPR_VALID signal to "1" when the ENTRY_VALID signal is "1", the output from the match detection circuit 65 is to be "1". The SRC1_UBA contains a write destination UBA of a preceding dependent instruction. When the write destination UBA matches the W_UBA, which is a write destination UBA of the completed instruction, it is understood that the instruction of the dependence source has completed and the SRC1_UBA has been discarded, and writing from the GUB 212 to the GPR 211 has been executed, and then, the SRC1_GPR_VALID signal is set to "1".

Figure 7:
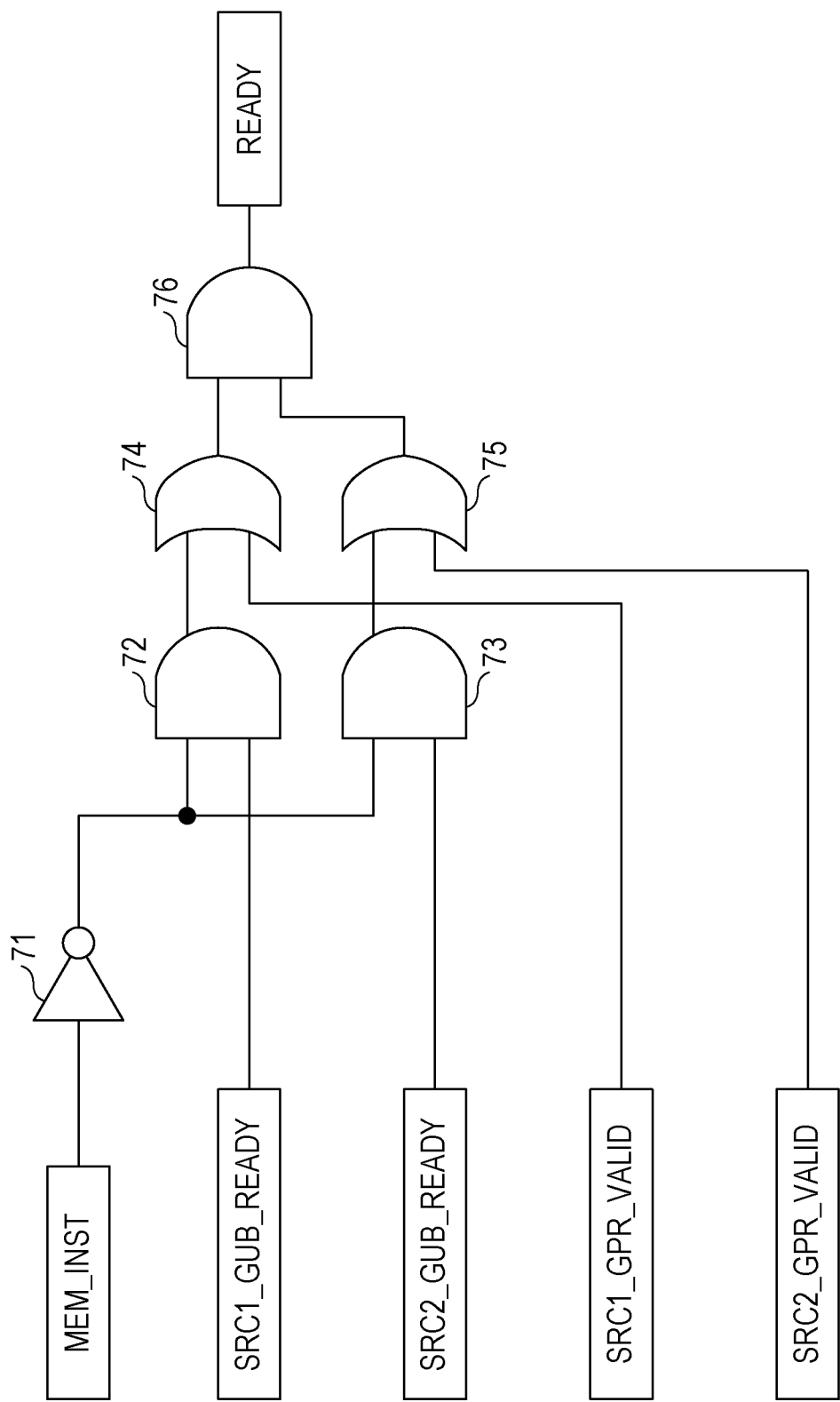
FIG. 7 illustrates an example of a circuit that generates a READY signal.

FIG. 7, with reference to FIG. 2, illustrates an example of a circuit that generates a READY signal for a reservation station. The circuits in FIG. 7 are provided for one entry, and include an inverter circuit 71, AND circuits 72, 73 and 76, and OR circuits 74 and 75. A MEM_INST flag is input to the AND circuits 72 and 73 via the inverter circuit 71. To the AND circuit 72, a SRC1_GUB_READY signal is also input. To the AND circuit 73, a SRC2_GUB_READY signal is also input. To the OR circuit 74, an output from the AND circuit 72 and a SRC1_GPR_VALID signal are input. To the OR circuit 75, an output from the AND circuit 73 and a SRC2_GPR_VALID signal are input. The SRC1_GPR_VALID signal indicates whether or not the processing refers to the GPR 211 of the GPR number that stores the source operand SRC1 of the entry. The SRC2_GPR_VALID signal indicates whether or not the processing refers to the GPR 211 of the GPR number that stores the source operand SRC2 of the entry. To the AND circuit 76, outputs from the OR circuits 74 and 75 are input. The AND circuit 76 outputs a READY signal.

The READY signal is not set "1" when the GPR 211 and the GUB 212 are not able to be read. The SRC1_GUB_READY signal and the SRC2_GUB_READY signal indicate whether or not processing results of dependent instructions of the source operand SRC1 and the source operand SRC2 are stored in the GUB 212 and can be read respectively. The SRC1_GUB_READY signal indicates whether or not the data can be read from the GUB 212 of the GUB number that stores the source operand SRC1 of the entry. The SRC2_GUB_READY signal indicates whether or not the data can be read from the GUB 212 of the GUB number that stores the source operand SRC2 of the entry. The SRC1_GUB_READY signal and the SRC2_GUB_READY signal are set by match detection of UBAs when a preceding instruction is issued to the fixed-point arithmetic circuit 12, the address calculation circuit 13, or the data cache 14. The MEM_INST flag indicates that the instruction to the entry is an operation instruction when a signal generated by instruction interpretation performed by the decode circuit 17 is registered in the reservation station 11 and the MEM_INST flag is "0". The MEM_INST flag is inverted in polarity by the inverter circuit 71 and "1" is input to the AND circuits 72 and 73. In this example, the SRC1_GUB_READY signal and the SRC2_GUB_READY signal that are the other inputs of the AND circuits 72 and 73 are output as the results of the AND circuits 72 and 73. When the MEM_INST flag is "1", it indicates that the instruction of the entry is a memory access instruction. In this example, one of the inputs of the AND circuits 72 and 73 become "0", and thus the outputs are "0". In the OR circuit 74, the output of the AND circuit 72 and the value of the SRC1_GPR_VALID signal are ORed, that is, the output of the OR circuit 74 indicates that the data of the source operand SRC1 is in the GUB or the GPR and can be read. Similarly, the output of the OR circuit 75 indicates that the data of the source operand SRC2 is in the GUB or the GPR and can be read. In the AND circuit 76, when both the source operand SRC1 and the SRC2 can be read, the output becomes "1" and the READY signal is set to "1".

In this embodiment, the signal obtained by inverting the polarity of the MEM_INST flag and the GUB_READY signal are ANDed by the AND circuits 72 and 73. By this processing, for a memory access instruction, the outputs of the AND circuits 72 and 73 are "0", and thus the READY signal does not become "1" until the GPR_VALID signal becomes "1".

Figure 8:
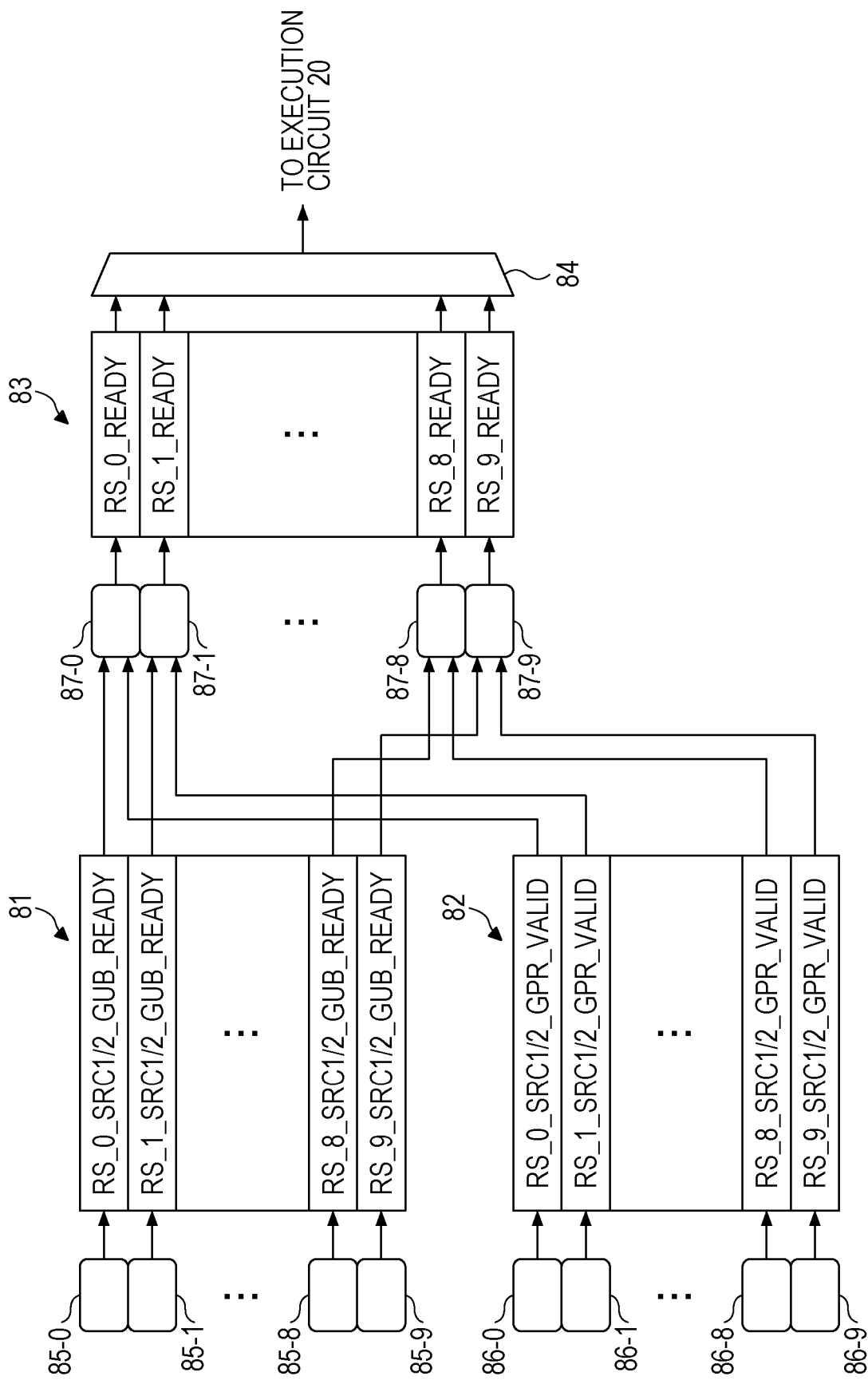
FIG. 8 illustrates an example of a reservation station.

FIG. 8 illustrates an example of a configuration of a reservation station, and illustrates the connection relationships in FIG. 5, FIG. 6, and FIG. 7. For the sake of convenience, in FIG. 8 with reference to FIG. 2, illustration of the connection from the decode circuit 17 and other signals is omitted. For the sake of convenience, FIG. 8 illustrates circuit sections for ten entries; however, the number of entries may be set in accordance with the usage.

Circuits 85-0 to 85-9 are provided for ten entries 0 to 9 respectively and each circuit has the configuration illustrated in FIG. 5. A circuit 81 includes storage cells that store the GUB_READY signals for the entries, such as flop-flops. For example, for the entry 0, the circuit 81 stores a RS_0_SRC1/2_GUB_READY signal for the source operands SRC1 and SRC2 from the circuit 85-0. Circuits 86-0 to 86-9 are provided for the ten entries 0 to 9 respectively and each circuit has the configuration illustrated in FIG. 6. A circuit 82 includes storage cells that store the GPR_VALID signals for the entries, such as flop-flops. For example, for the entry 0, the circuit 82 stores a RS_0_SRC1/2_GPR_VALID signal for the source operands SRC1 and SRC2 from the circuit 86-0. Circuits 87-0 to 87-9 are provided for the ten entries 0 to 9 respectively and each circuit has the configuration illustrated in FIG. 7. A circuit 83 includes storage cells that store the READY signals for the entries, such as flop-flops. For example, for the entry 0, the circuit 83 stores a RS_0_READY signal from the circuit 87-0. A selector circuit 84 selects, from a RS_0_READY signal to a RS_9_READY signal for the entries 0 to 9 that are stored in the circuit 83, signals that become "1" from an oldest signal as READY signals to the execution circuit 20.

Figure 9:
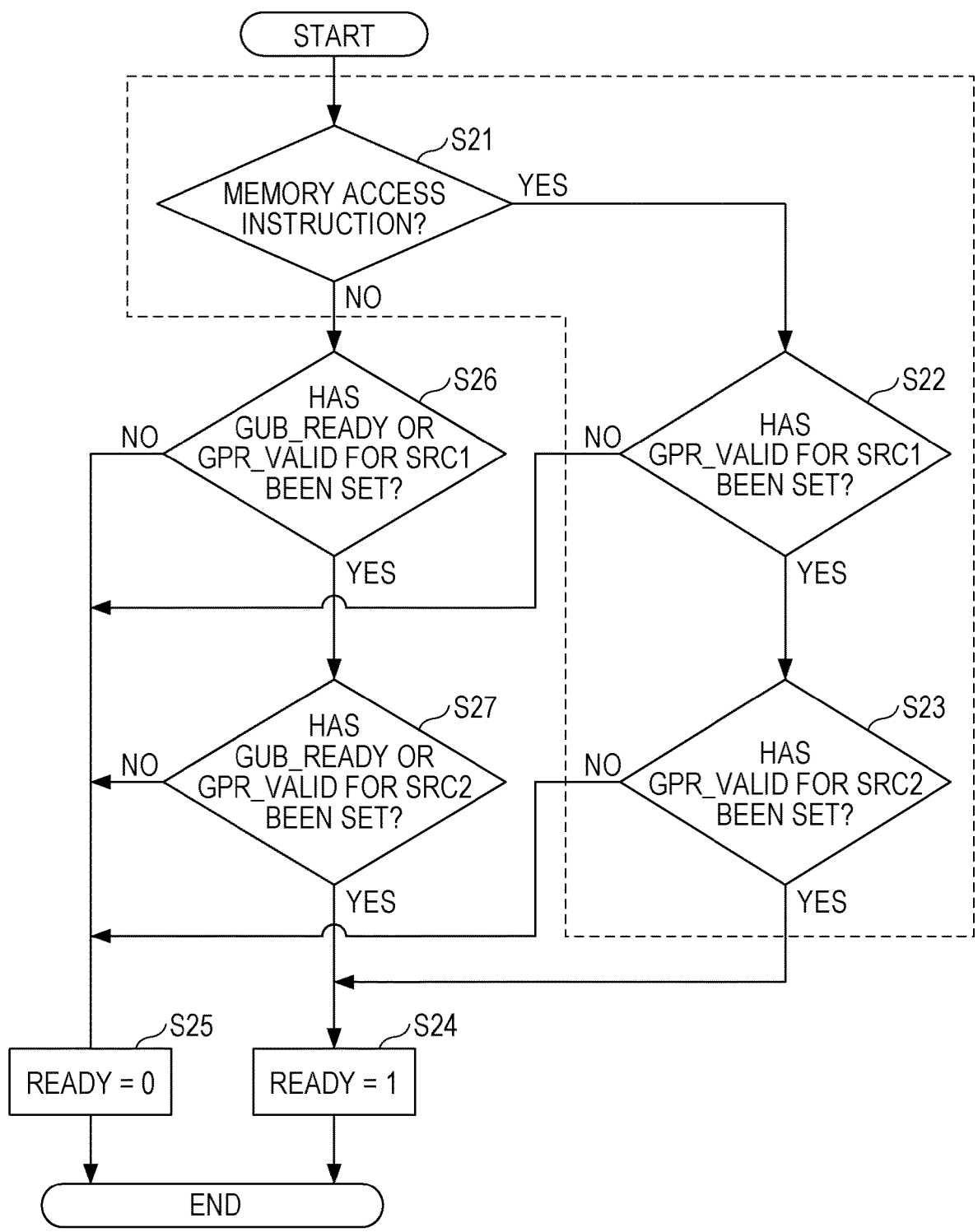
FIG. 9 is a flowchart illustrating the processing of generating a READY signal.

FIG. 9 is a flowchart illustrating the processing of generating a READY signal. The processing illustrated in FIG. 9 corresponds to the operation of the selector circuit 84 in FIG. 8.

First, whether an instruction is a memory access instruction or not is determined (step S21). When the instruction is a memory access instruction (YES in step S21), whether a GPR_VALID signal for the source operand SRC1 has been set or not is determined (step S22). When the determination result in step S22 is YES, whether a GPR_VALID signal for the source operand SRC2 has been set or not is determined (step S23). When the determination result in step S23 is YES, a corresponding READY signal is set to "1" (READY=1) (step S24), and the process ends.

On the other hand, when a GPR_VALID signal has not been set for the source operand SRC1 and the determination result in step S22 is NO, or when a GPR_VALID signal has not been set for the source operand SRC2 and the determination result in step S23 is NO, a corresponding READY signal is set to "0" (READY=0) (step S25), the process ends.

In the first determination of a memory access instruction, when the instruction is not a memory access instruction but an operation instruction, the determination result in step S21 becomes NO. Then, whether a GUB_READY signal or a GPR_VALID signal for the source operand SRC1 has been set or not is determined (step S26). When the determination result in step S26 is YES, whether a GUB_READY signal or a GPR_VALID signal for the source operand SRC2 has been set or not is determined (step S27). When the determination result in step S27 is YES, a corresponding READY signal is set to "1" (READY=1) (step S24), and the process ends.

When neither a GUB_READY signal nor a GPR_VALID signal has been set for the source operand SRC1 and the determination result in step S26 is NO, or when neither a GUB_READY signal nor a GPR_VALID signal has been set for the source operand SRC2 and the determination result in step S27 is NO, a corresponding READY signal is set to "0" (READY=0) (step S25), the process ends.

By the processes in steps S21 to S23 surrounded by the dotted line in FIG. 9, as measures against the attacks such as Spectre, the speculative execution of the memory access in the process (2) is restricted by the reservation station 11. Specifically, whether the load instruction in the process (1) has been completed, that is, whether or not the instruction is a speculative access and has been canceled is determined. When the speculative access has been canceled, the execution is canceled before the execution of the memory access in the process (2), and thus the trace of the memory access does not remain in the data cache 14.

In the above-described example, the operation according to the embodiment is implemented by using the existing GPR_VALID signal. However, even if there is no signal that corresponds to the GPR_VALID signal, a signal that corresponds to the GPR_VALID signal capable of indicating an instruction completion state, for example, a signal that is capable of indicating a completion state of a dependent instruction with respect to a source operand may be added to implement the operation.

In the above-described embodiment, the reservation station focuses on the memory access instruction as the target to be restricted, and after a memory access instruction is issued, the reservation station waits for the completion of the memory access instruction to issue a subsequent instruction to the execution circuit. Furthermore, when the reservation station issues an operation instruction to the execution circuit, after detecting that all operands to be used for the processing are ready, in the next cycle, issues a subsequent instruction to the execution circuit, and thus enabling the speculative execution of the operation instruction. Since the reservation station waits for the completion of an instruction of an address generation dependent source and issues a memory access instruction to the execution circuit, the performance deterioration of the processor may be reduced.

Furthermore, the reservation station restricts some of the speculative execution and thus the security strength against the security vulnerabilities of the processor may be increased.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A processing apparatus comprising:
   a decode circuit configured to issue an instruction code obtained by decoding an instruction;
   a reservation station circuit configured to:
      store a plurality of instruction codes, each of the plurality of instruction codes being the instruction code issued from the decode circuit;
      select an instruction code from among the plurality of instruction codes to issue the selected instruction code, the selected instruction code being one of the plurality of instruction codes that is ready to be executed; and
   an execution circuit configured to:
      obtain the selected instruction code from the reservation station circuit;
      execute the obtained instruction code; and
      in response to completion of executing of the obtained instruction code, issue a completion notification,
   the reservation station circuit is further configured to:
      in response to the selected instruction code that is an operation instruction, issue the selected instruction code to the execution circuit after detecting that operands to be used for executing the operation instruction are ready;
      in response to the selected instruction code that is a memory access instruction, wait to issue the selected instruction code to the execution circuit until detecting completion of executing of a previous instruction code, the previous instruction code being an instruction code previous to the selected instruction code; and
      in response to detecting that the executing of the previous instruction code is canceled, discard the selected instruction code that is the memory access instruction.

2. The processing apparatus according to claim 1, wherein the reservation station circuit is configured to:
   determine whether the selected instruction code is a speculative memory access instruction based on a state of the previous instruction code; and
   in response that the selected instruction code is the speculative memory access instruction, suspend an issuance of the selected instruction code until the completion of the previous instruction code.

3. The processing apparatus according to claim 1, wherein the decode circuit is configured to:
   interpret the instruction, and
   set, to the reservation station circuit, information indicating whether the instruction is a memory access instruction or an operation instruction.

4. The processing apparatus according to claim 1, wherein the reservation station circuit is configured to, when the selected instruction code is the memory access instruction, issue the selected instruction code after detecting the completion of executing of a previous instruction code.

5. The processing apparatus according to claim 1, further comprising:
   a register management circuit having a table that records a first number of a buffer allocated by the decode circuit to a register included in the execution circuit; and
   a reorder buffer configured to complete the instructions in accordance with an original order,
   wherein the reorder buffer is configured to:
      receive a second number from the decode circuit, receives the first number from the register management circuit; and
      send the second number and the first number to the execution circuit at the time of instruction completion, and
   wherein the execution circuit is configured to:
      write data in the buffer to the register; and
      perform processing to be performed at the time of the completion of the instruction to reflect the results of the processing and load in the register, thereby the result is observable from software.

6. A control method executed by a processor included in a processing apparatus, the control method comprising:
   executing decode processing configured to issue an instruction code obtained by decoding an instruction;
   executing a reservation processing configured to:
      store a plurality of instruction codes, each of the plurality of instruction codes being the instruction code issued from the decode circuit; and
      select an instruction code from among the plurality of instruction codes to issue the selected instruction code, the selected instruction code being one of the plurality of instruction codes that is ready to be executed;
   executing an execution processing configured to:
      obtain the instruction code selected by the reservation processing;
      execute the obtained instruction code; and
      in response to completion of executing of the obtained instruction code, issue a completion notification,
   the reservation station processing is further configured to:
      in response to the selected instruction code that is an operation instruction, issue the selected instruction code to the execution processing after detecting that operands to be used for executing the operation instruction are ready;
      in response to the selected instruction code that is a memory access instruction, wait to issue the selected instruction code to the execution circuit until detecting completion of executing of a previous instruction code, the previous instruction code being an instruction code previous to the selected instruction code; and
      in response to detecting that the executing of the previous instruction code is canceled, discard the selected instruction code that is the memory access instruction.

7. The control method according to claim 6, wherein the reservation processing is configured to:
   determining whether the memory access instruction is speculative based on a state of a preceding instruction; and in response that the memory access instruction is speculative, suspend an issuance of the memory access instruction until the completion of the preceding instruction.

8. The control method according to claim 6, wherein the decode processing is configured to:
   interpret the instruction;
   set, to the reservation processing, information indicating whether the instruction is a memory access instruction or an operation instruction.

9. The control method according to claim 6, wherein the reservation processing is configured to,
   when the selected instruction code is the memory access instruction
   ,issue the selected instruction code after detecting the completion of executing of a previous instruction code.

10. The control method according to claim 6, further comprising:
   storing a first number of a buffer allocated to a register;
   completing the instructions in accordance with an original order;
   receiving the first number of the buffer and a second number of the register;
   sending the first number and the second number at the time of instruction completion;
   writing the data in the buffer to the register;
   performing the processing to be performed at the time of the completion of the instruction to reflect the results of the processing and load in the register, thereby the result is observable from software.

* * * * *